INVENTOR

BY

ATTORNEY

United States Patent Office 3,214,639
Patented Oct. 26, 1965

3,214,639
FAULT CLEARANCE DEVICES FOR ELECTRIC POWER TRANSMISSION AND DISTRIBUTION POLYPHASE FEEDER SYSTEMS
Leon Cabanes and Charles Dietsch, Paris, Seine, France, assignors to Electricité de France-Service National, Paris, France
Filed Nov. 1, 1960, Ser. No. 66,581
Claims priority, application France, Feb. 3, 1955, 684,943; Jan. 25, 1956, 56,552, Patent 1,121,097
14 Claims. (Cl. 317—18)

The present invention relates to fault clearance devices for electric power transmission and distribution polyphase feeder systems and it is more especially concerned with devices for clearing or eliminating both transient faults (arcs) and permanent faults, whether these faults are monophase ground faults, interphase faults or polyphase ground faults, occurring as well in radial feeder systems as in ring feeder systems or ring mains having a neutral conductor which is either directly grounded, or connected with the ground through an element having a low impedance.

The object of this invention is to reduce the number of high breaking capacity circuit-breakers necessary for the protection of such feeder systems, and in particular of the feeder lines starting from, or leading to, a given station, with one or several busbar set or sets.

Another object of the invention is to improve the continuity of supply, on the one hand by supplying current through the two healthy phases in case of a fault between a single-phase and the ground, and on the other hand by reducing to a minimum the stoppage of current in case of two-phase or three-phase fault (either ground fault or interphase fault).

Still another object of our invention is quickly to eliminate arc faults without producing residual arcs.

According to the present invention, every station, including at least one busbar set to which several polyphase feeder lines can be connected each through a polyphase control isolating switch, includes a high breaking capacity circuit-breaker of the single-phase control type, at least for circuit closing, disposed between said busbar set and the ground, and protective control means capable, in response to the occurrence of a fault in at least one of said polyphase lines actually connected with the busbar set, of controlling the corresponding phase so that said circuit-breaker grounds said phase of the busbar set for a portion of a second.

Preferred embodiments of the present invention will be hereinafter described with reference to the accompanying drawings, given merely by way of example and in which.

Figure 1:
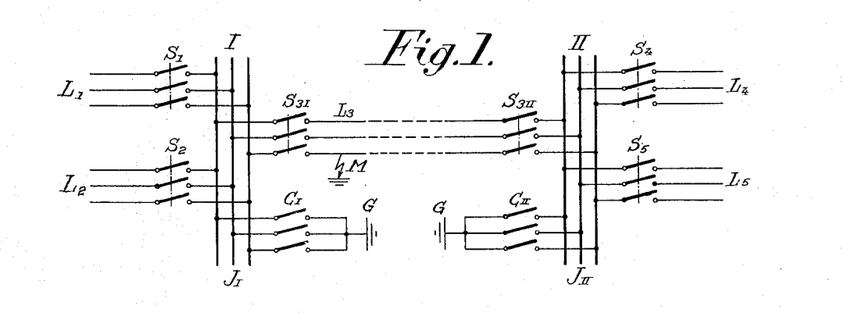
FIG. 1 diagrammatically shows the device according to the invention, according to a first embodiment thereof.
Figure 2:
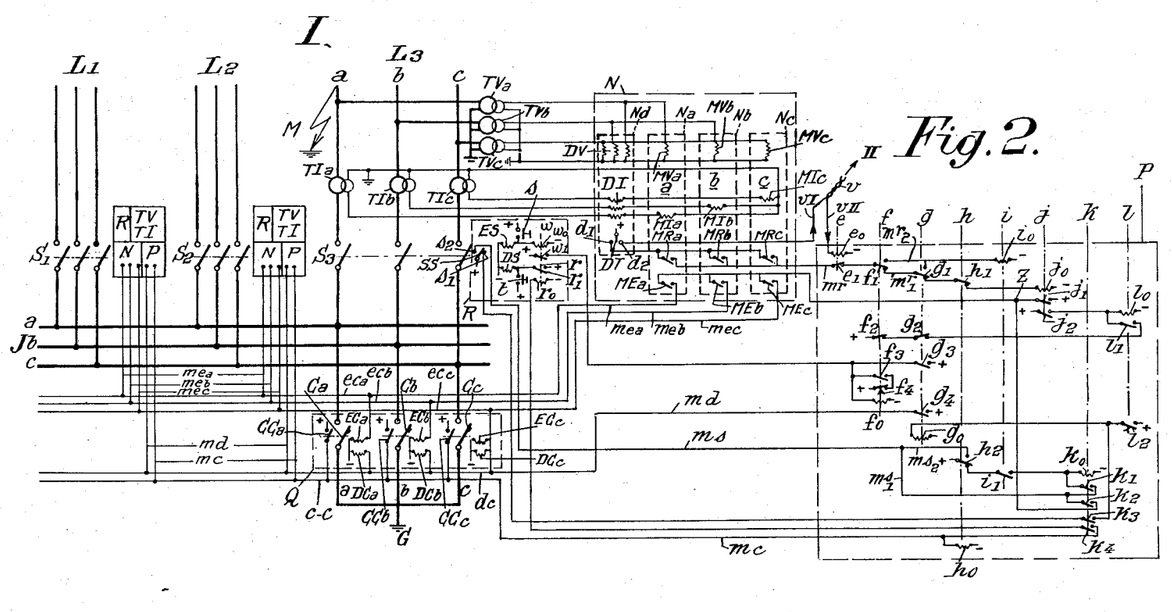
FIG. 2 is a detail view showing a portion of the device of FIG. 1.
Figure 3:
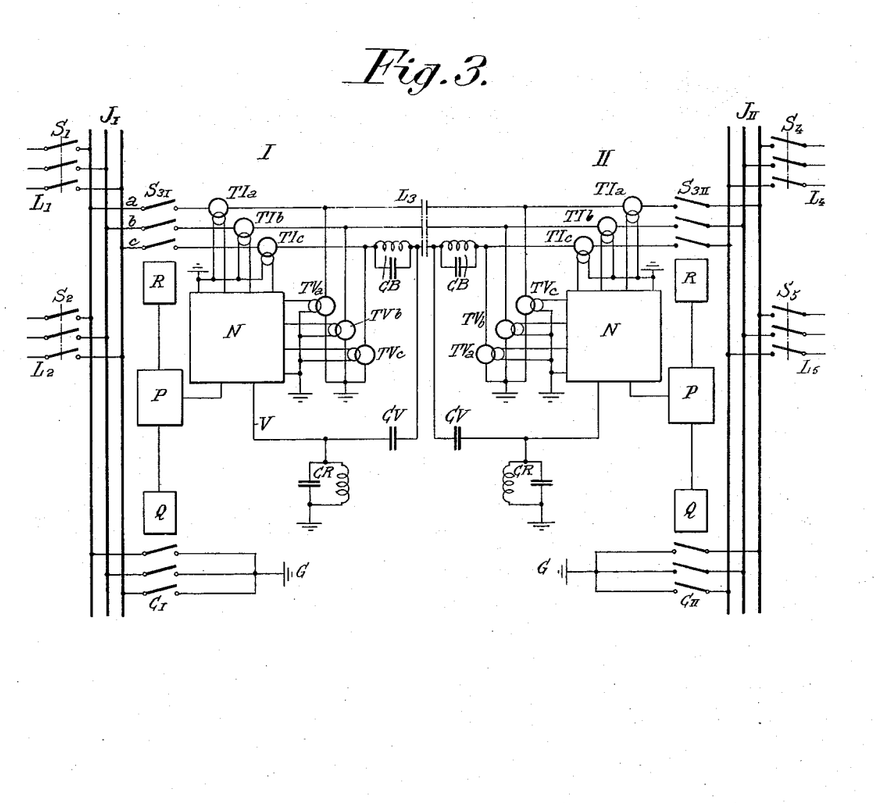
FIG. 3 diagrammatically shows a modification of the embodiment of FIGS. 1 and 2, transmission of orders for the simultaneous operation of the circuit-breakers in the two stations being obtained by means of carrier currents in this modification.

*First type of embodiments (with a single busbar set):*
*FIGURES 1, 2 and 3*

With reference first to the diagrammatical view of FIG. 1, the main concept of the invention is as follows. On this figure, we have illustrated—in a high voltage three-phase distribution feeder system with a grounded neutral conductor—two high voltage stations I and II each comprising a busbar set, $J_I$ and $J_{II}$ respectively, from which start three feeder lines $L_1$, $L_2$ and $L_3$ for station I and $L_3$, $L_4$ and $L_5$ for station II, line $L_3$ connecting stations I and II together.

In the prior art devices that are most commonly used, the faults are cleared by means of high breaking capacity automatic circuit-breakers having three-phase controls (for the three phases simultaneously) disposed between every line and every busbar set at the points indicated at $S_1$, $S_2$, $S_{3I}$, $S_{3II}$, $S_4$ and $S_5$ on FIG. 1.

On the contrary, according to the invention, we provide the following elements:

On the one hand, between every line and every busbar set, and in such manner as to permit deliberate connection and disconnection through manual operations (and also, as it will be hereiafter explained with reference to FIG. 2, automatic disconnection in case of permanent fault), an isolating switch $S_1$, $S_2$, $S_{3I}$, $S_{3II}$, $S_4$, $S_5$ having a relatively low breaking capacity;

On the other hand, between said busbar set and the ground G, a circuit-breaker C (respectively $C_I$ and $C_{II}$ for the two stations) having a high breaking capacity and a single-phase control (that is to say a control phase by phase) at least for circuit closing;

And protective control means capable, at every station, when a fault M occurs in at least one phase of one of the polyphase lines L actually connected with a busbar set of the station, of controlling the corresponding phase of the circuit-breaker C connected with this busbar set so that it connects with the ground at least the corresponding phase of the busbar set during a portion of a second.

Said protective means comprise on the one hand apparatus detecting faults in each of the phases of a feeder line (either a ground fault or interphase faults, or a fault both with the ground and with one or several of the phases), and on the other had a system of relays which, in response to a fault signal coming from said apparatus, control first the closing of the corresponding phase of circuit-breaker C, then, after a portion of a second, the opening of this same phase of the circuit-breaker. Furthermore, if the fault is a permanent one, the whole of the relays produces the opening of the isolating switch S which connects the faulted line with the busbar set, in such manner as to isolate the faulty line before the opening of the grounding circuit-breaker, these operations taking place at every station to which the busbar set is connected.

The fault detecting apparatus are well known in the art and there will be no difficulty in combining relays for obtaining the above mentioned results. A particular embodiment of such apparatus and relays is illustrated by FIG. 2 in a high voltage station, for instance station I, whereas FIG. 3 shows a modification of the means for achieving synchronization of the grounding in the two stations to which the feeder line, such as $L_3$, in which a fault M has occurred, is connected.

FIG. 2 shows the busbar set $J_1$, designated merely by J, of station I with its feeder lines $L_1$, $L_2$ and $L_3$ (this last mentioned line leading to station II which is not visible on FIG. 2), the isolating switches $S_1$, $S_2$, $S_3$ (by abbreviation of $S_{3I}$), of the multiphase control type and having a low breaking capacity, and the grounding circuitbreaker C (by abbreviation of $C_I$), of the single-phase control type (phase by phase) and having a high breaking capacity.

The protective means comprise:

Measurement transformers, to wit three voltage transformers $TV_a$, $TV_b$, $TV_c$ for each of the three phases and three current transformers $TI_a$, $TI_b$, $TI_c$ for each of the three phases;

a system N of relays capable of detecting faults which comprises:

(1) Three starting and phase selecting relays $Na$, $Nb$, $Nc$ (one for each phase), each relay, which is for instance of the definite impedance relay type (hereinafter discussed in a more detailed fashion with reference to FIG. 7), consisting of a winding $MVa$, $MVb$, $MVc$ disposed in the secondary circuit of a voltage transformer $TVa$, $TVb$, $TVc$ respectively, a winding $MIa$, $MIb$, $MIc$ disposed in the secondary circuit of a current transformer $TIa$, $TIb$, $TIc$ respectively, a starting contact $MRa$, $MRb$, $MRc$ and a selecting or phase tripping contact $MEa$, $MEb$, $MEc$, both of these contacts being closed in case of a fault M in line $L_3$ in the corresponding phases $a,b,c$; the three contacts $MRa$, $MRb$, $MRc$ of the three relays $Na$, $Nb$, $Nc$ are disposed in parallel on a single starting line $mr$ so as to permit the feed of this line as soon as one of these three contacts is closed (that is to say as soon as a fault has occurred in any phase), whereas the three contacts $MEa$, $MEb$, $MEc$ of the three relays $Na$, $Nb$, $Nc$ are disposed in three distinct lines $me_a$, $me_b$, $me_c$ for selection or phase tripping to permit the feed of this line when the corresponding contact is closed (that is to say when a fault has occurred in the corresponding phase);

(2) A directional relay $Nd$ constituted by three windings DV each disposed in shunt with a winding NV in the secondary circuit of a voltage transformer TV, by three windings DI each disposed in series with a winding MI in the secondary circuit of a current transformer TI, and by a movable contact DT which, in case of fault in one or several phases of line L, comes against fixed contact $d_1$, in order to supply the starting line $mr$, and, in case of fault in another line (such as $L_2$) which is not connected with the high voltage station II, comes against fixed contact $d_2$, in order to send a locking order to station II through line $v_I$;

A system P of sequential relays including relays $e$, $f$, $g$, $h$, $i$, $j$, $k$, $l$ each with a winding identified by index O and with one or several contacts identified by indexes 1,2,3,4, the contacts being shown in position of rest;

A unit Q for controlling circuit-breaker C (which is of the single-phase control type at least for the closing of each of its phases), this unit including three closing coils $ECa$, $ECb$, $ECc$ each of which, when it is fed with current, produces the closing of the contact $Ca$, $Cb$, $Cc$ of the corresponding phase of the circuit-breaker and at the same time of the corresponding repeater auxiliary contact $CCa$, $CCb$, $CCc$ (which serves to repeat the position of the main contact for every phase, the three contacts $CCa$, $CCb$, $CCc$ being connected in parallel with a line $cc$) and three tripping or opening coils $DCa$, $DCb$, $DCc$ each of which, when it is fed with current, produces the opening of contacts $Ca$ and $CCa$, $Cb$ and $CCb$, $Cc$ and $CCc$ of the corresponding phase of the circuit-breaker (it will be noted that if the closing controls of the three poles $Ca$, $Cb$, $Cc$ of the circuit-breaker must be independent according to the invention in order to ground only the phase or phases where a fault has occurred, the tripping or opening coils $DCa$, $DCb$, $DCc$ may be controlled simultaneously in parallel because an opening order can be complied with by a pole of the circuit-breaker only if this pole has been precedingly closed; on FIG. 2, we have connected in parallel the three opening windings which are simultaneously fed from a line $dc$, whereas of course every closing winding $ECa$, $ECb$, $ECc$ is fed particularly from one line $ec_a$, $ec_b$, $ec_c$, connected with the corresponding phase closing line $me_a$, $me_b$, $me_c$, adapted to be cut off by a phase selection contact $MEa$, $MEb$, $MEc$);

Finally, a unit R for controlling isolating switch $S_3$ of the three-phase control type (that is to say simultaneous control for the three phases) both for circuit closing and opening, this unit comprising a single closing coil ES for the three phases $a$, $b$, $c$ of the switch $S_3$ which is fed by the deliberate closing of contact $t$ (in case of an operation for connecting line $L_3$), a single tripping or opening coil DS for the three phases of the switch $S_3$ which is energized, either by the deliberate closing of contact $t$ (in case of disconnection of line $L_3$), or by the closing of contact $r_1$ (when coil $r_0$ is fed with current in case of permanent fault in line $L_3$), and a reversing auxiliary contact SS which is located on contact $s_1$ when $S_3$ is open and on contact $s_2$ when $S_3$ is closed.

It will be noted that transformers TI and TV, systems N and P and unit R correspond to one of the feeder lines such as $L_3$ for which they have been shown in FIG. 2, whereas unit Q is common to all the feeder lines $L_1$, $L_2$, $L_3$ connected to the same busbar set J (which may be grounded, according to the invention, by means of a shunt circuit-breaker C having a single-phase control (at least for circuit closing), lines $ec_a$, $ec_b$, $ec_c$ being connected to selecting or phase closing lines $me_a$, $me_b$, $me_c$ of every feeder line $L_1$, $L_2$, $L_3$, whereas line $dc$ is connected to the line $md$ for opening every feeder line $L_1$, $L_2$, $L_3$, and line $cc$ is connected to the line $mc$ of every feeder line $L_1$, $L_2$, $L_3$.

The operation of the protective device of FIGS. 1 and 2 takes place as follows:

(1) Operation in case of a single-phase transient fault. If a transient fault M occurs between one of the phases and the ground in feeder line $L_3$ connected between stations I and II (switch S being closed at each end and therefore $S_3$ being closed in FIG. 2 and $S_{3I}$ and $S_{3II}$ closed in FIG. 1).

In response to this fault, relay $Na$ will close its contacts $MRa$ and $MEa$, whereas directional relay $Nd$ will close its contact $d_1$.

Due to the closing of $d_1$, the directional relay $Nd$ does not send a locking order through line $v_I$ to the other station II in which are performed exactly the same operations as will be hereinafter described. In particular, station II will not send a locking order through line $v_{II}$ (lines $v_I$ and $v_{II}$ being for instance assembled to form a pilot wire $v$), which keeps contact $e_1$ closed so that the winding $e_0$ thereof is not energized.

The closing of contact $MRa$ has for its effect to energize through line $mr$ the winding $jo$ of relay $j$ through contact $e_1$, which is closed (for the reason above indicated), contact $f_1$ (which is closed in the position illustrated where it connects line $mr$ with line $mr_1$), contacts $g_1$ and $h_1$ which are closed (state of rest). Relay $j$ closes its contacts $j_1$ and $j_2$. The closing of $j_1$ has for its effect to energize, through line $me_a$ the contact $MEa$ of which is closed (fault in the phase to be detected by relay $Na$) and line $ec_a$, the closing winding $ECa$ of the phase $a$ of circuit-breaker C. The pole $Ca$ of this circuit-breaker is closed, this grounding the phase $a$ of the set of busbars J and of line $L_3$. The same operation has taken place at the other station (station II) to which line $L_3$ is connected. The phase $a$ of this line is therefore grounded at both ends. In the case of a transient fault, this fault is eliminated after 2 or 3 periods of the current conveyed through the line (about $\frac{1}{20}$ of a second for current of 50 or 60 cycles per second) without a residual arc being maintained due to the fact of a sharp grounding at both ends. As soon as the transient fault has disappeared, contacts $MRa$, $Mb$, $MEa$ and $d_1$ open, relay $j$ is no longer energized and the closing winding $ECa$ ceases to be energized.

As above indicated, the closing of contact $j_2$ has taken place at the same time as that of contact $j_1$ as soon as the fault appeared. The closing of $j_2$ produces the energizing of relay $l$ the winding $l_0$ of which is fed through contact $l_1$ and closed contacts $f_2$ and $g_2$. Relay $l$ closes, after a given time period of a portion of a second (for instance of ¼ of a second for a feeder line with current at 60 periods), its time-lag contact $l_2$, which energizes relay $g$ through its winding $g_0$. Energizing of $g$ opens contacts $g_1$ and $g_2$, which has for its effect to prevent the sending of a new closing order through line $m_2$ cut off at $g_1$ and to deenergize relay $l$ by cutting its feed at $g_2$, and closes contacts $g_3$ (the function of which will be hereinafter explained) and $g_4$, the closing of $g_4$ having for its effect to feed, through lines $md$ and $dc$, the closing windings $ECa$, $ECb$, $ECc$ of circuit-breaker C: only the pole $Ca$ which has been closed precedingly by the closing winding $ECa$ is actually open. This operation taking place at both of the stations I and II, line $L_3$ can then be restored to normal service after a portion of a second (about ¼ of a second), the single-phase transient fault having been cleared very quickly (about 1/20 of a second) by mere closing then simultaneous opening of the faulty phase of shunt-circuit-breakers $C_I$ and $C_{II}$ of stations I and II at both ends of the feeder line. It will be noted that there is no stopping in the supply through the feeder system, even in case of a radial feeder (which is a considerable advantage over the prior art, since Mr. Kaufmann indicates in his book "The Protective Gear Handbook," Pitmann, London, pp. 23 and 24, that continuity of the supply requires two feeds and cannot be obtained in the case of radial feeder systems: "Radial feeders do not strictly meet the requirement of two alternative feeds and as a result 100 percent continuity of supply cannot be provided"). As a matter of fact, in line $L_3$ only the faculty phase is grounded and the two other phases keep conveying current, which is generally sufficient to ensure a satisfactory continuity of supply.

(2) Operation in case of a single-phase current permanent fault. The method of clearing the fault comprises a first period of operation which includes the operations above described with relation to a single-phase transient fault. For instance, for a fault in phase $a$, these operations are:

Closing of the contacts $MRa$, $MEa$ of relay $Na$ and $d_1$ of relay $Nd$,

Energizing or relay $j$,

Closing of the pole $Ca$ of the circuit-breaker by energizing of the closing winding $ECa$, Energizing of relay $l$ then of relay $g$ after 15 periods of current, Opening of the pole $Ca$ of the circuit-breaker by energizing of the tripping winding $DCa$, and this at both of the stations I and II.

At this time begins the second period of operation which is intended to disconnect feeder lines $L_3$ so as to permit, on the one hand the return to normal conditions for the set of busbars and for the other lines $L_1$ and $L_2$ connected with the set of busbars, and on the other hand the repairing of line $L_3$ in a safe conditions. At the beginning of this second period, relays $Na$ and $Nd$ again find the fault in the line, but the relays of system P are no longer all in the same position as at the beginning of the first period when this fault made its appearance. As a matter of fact, the energizing of relays $l$ has had for its effect, as above indicated, to open $g_1$ and $g_2$ and to close $g_3$. Consequently, relay $l$ is deenergized, whereas relay $f$ is energized. Relay $f$ is fed locally through its contact $f_3$, and this for several seconds, the time-lag relay $f_4$ opening after a predetermined time (for instance 30 to 60 seconds). Owing to this long time-lag, a repeated transient fault (for instance a branch of a tree striking the phase of a feeder line at intervals ranging from 2 to 10 seconds) is dealt with as if it were a permanent fault, which is advantageous for the cause of such a fault must be finally eliminated in the same way as that of a permanent fault. Energizing of relay $f$ opens its contact $f_1$ (which then comes into the position where it connects lines $mr$ and and $mr_2$) and also its contact $f_2$ during this predetermined time period.

When the fault signal reappears (the fault in this case being either a permanent one or a repeated transient fault), as a consequence of the opening of the pole $Ca$ of circuit-breaker C at the end of the first period of operation, the protective relays of system N operate as above stated, but they energize only relay $i$ through line $mr_2$ and no longer relay $j$ through line $mr_1$. Relay $i$ closes its contact $i_1$, which energizes, through contact $h_2$ in the off-position thereof, relay $k$ the winding $k_0$ of which continues to be fed with current through its self-holding contack $k_1$, lines $ms_1$ and $ms$ and the closed contact $s_2$ (switch $S_3$ and its repeater $s_2$ being closed because the feeder line $L_3$ is connected). Relay $k$ also closes its contact $k_2$, thereby energizing, through closed contacts $k_2$, $i_1$, $k_1$ $ME_a$ (phase selection contact) and lines $me_a$ and $ec_a$, the closing winding $ECa$ of the pole $Ca$ of circuit-breaker C, which again grounds the phase $a$ of feeder line $L_3$.

As soon as this pole $Ca$ is closed, relay $h$ is energized through the auxiliary contact $CCa$ and line $cc$ and a line $mc$, which feed current to the winding $h_0$ of relay $h$. Energizing of relay $h$ opens contacts $h_1$ and $h_2$, the consequence of which is:

On the one hand, to prevent any operation of circuit-breaker C by a feeder line other than that which has produced the operation as a consequence of a fault (by opening $h_1$ in the systems P of the other feeder lines such as $L_1$ and $L_2$, because windings $h_0$ with their contacts $h_1$ and $h_2$ are provided in the sequential system P of every other feeder line, the closing of auxiliary contact $CCa$ having for its effect to energize through the different lines $mc$ all the windings $h_0$ of the systems P relative to the busbar set J to which circuit-breaker C is associated;

And on the other hand, to permit the direct feed of current to relay $k$ (through contact $h_2$, which comes into the upper position thereof, lines $ms_2$ and $ms_1$ and contact $k_1$ kept in the closed position) as long as the pole $Ca$ of circuit-breaker C is closed (this taking place identically for each of the poles, because the contacts $CCa$, $CCb$ and $CCc$ are mounted in parallel with windings $h_0$), to replace the feed of this relay $k$ through contact $s_2$ which is going to be cut off.

As a matter of fact, the same time as it produces the energizing of relays $h$, the closing of contact $CCa$ produces the energizing of the winding $r_0$ of feeder line $L_3$ through contact $k_4$, this energizing taking place only for the feeder line in which a fault has occurred, because $k_4$ is closed only for this feeder line due to the maintained energizing of relay $k$ in response to the energizing of the corresponding relay $i$. The energizing of winding $r_0$ causes contact $r_1$ to close, which energizes the windings DS for the opening or tripping series switch $S_3$, which disconnects the faulty feeder line $L_3$. The same series of operations having taken place at the two stations I and II, feeder line $L_3$ is isolated and it is possible to look for the cause of the permanent faults and to eliminate them without any danger.

As soon as switch $S_3$ is open, its repeating auxiliary contact pivots, which opens $s_2$ and closes $s_1$: the feed of relay $k$ through $s_2$ is cut off and it is only fed through $h_2$. This maintained energizing of relay $k$ has for its object to permit a new energizing of the winding $g_0$ of relay $g$ through closed contacts $k_3$ (of relay $k$) and $s_1$ (which is now closed). Relay $g$ then gives, as during the first period of operation, an order of opening the pole $Ca$ of the shunt circuit-breaker C, by energizing through its contact $g_4$ the opening windings $DCa$, $DCb$, $DCc$ only one of which, to wit $DCa$, acts upon its pole $Ca$ (which is the only one to be closed in the case of a permanent fault in phase $a$). The repeating auxiliary contact $CCa$ also opens, which deenergizes relay $h$. This causes the return of contact $h_2$ into the position shown by the drawing and therefore the deenergizing of relay $k$ so that, in particular, contact $k_3$ is opened and the winding $r_0$ of relay $r$ is no longer fed with current so that it is deenergized.

At this time, the shunt circuit-breaker C and the series switch $S_3$ are open and the relays return to their initial state. Feeder line $L_3$ is no longer alive and the protective means can deal with any fault as may occur in the other feeder lines $L_1$ and $L_2$ connected to the busbar set J.

(3) Summary of the operation in case of a single-phase fault. If the fault is transient, the contacts of the directional relay N$d$ and of the starting and phase selection relay N$a$ of the interested phase cause relay $j$ to be energized and to bring into action the pole C$a$ of the shunt circuit-breaker C. Relay $l$ which has been energized by relay $j$ produces through relay $g$, the opening of this pole C$a$ after a period of time (averaging ¼ of a second) determined by the time-lag of the contact $l_2$ of relay $l$. Relay $g$, at the time where it produces the opening of circuit-breaker C, energizes relay $f$ which remains fed through its time-lag contact $f_4$ during some seconds (for instance from 30 to 60 seconds).

If the fault is permanent or if it is a repeated transient fault, that is to say if the fault occurs again during the time for which relay $f$ remains energized, it is relay $i$ which is energized by the contacts of the directional relay N$d$ and the starting and phase selecting relay N$a$. Relay $i$ energizes relay $k$ which brings into play its current feeding means and closes the pole C$a$ of circuit-breaker C (through $k_2$). Immediately, the auxiliary contact CC$a$ of this pole controls the opening of switch $S_3$ (through $k_4$ and relay $r$). As soon as switch $S_3$ is open, relay $g$ is again energized (through $k_3$) and causes pole C$a$ to open. It will be noted that relay $f$ having been energized at the end of the first period of operation, the closing of contact $g_3$ has no effect upon the operation of relay $f$.

(4) Operation in case of two-phase or three-phase fault between the phases or between phases and the ground. The operation of the relays, in the case of a two-phase or three-phase fault, either transient or permanent, is exactly the same as in the case of a single-phase fault, either transient or permanent respectively, with the exception that:

If the fault is a two-phase fault, two starting and phase selecting relays N (for instance N$a$ and N$b$ when the fault is in phases $a$ and $b$) close their contacts MR and ME and send the closing order for circuit-breaker C (resulting at Z from the energizing of relay $j$ and, in case of a permanent or repeated fault, also of relays $i$ and $k$) through two lines $me$ (for instance $me_a$ and $me_b$) on the two interested phases, with closing of two poles (for instance C$a$ and C$b$);

If the fault is a three-phase one, the three relays N$a$, N$b$, N$c$ close their contacts MR$a$, MR$b$, MR$c$ and ME$a$, ME$b$, ME$c$ and send the order of closing circuit-breaker C (resulting at Z from the energizing of relay $j$ and, in case of a permanent or repeated fault, also of relays $i$ and $k$) through the three lines $me_a$, $me_b$ $me_c$ on the three phases, with closing of the three poles C$a$, C$b$, C$c$.

(5) Operation for connecting and disconnecting feeder lines $L_1$, $L_2$, $L_3$. In order to connect or disconnect feeder line $L_3$ for instance, it suffices to close or to open, respectively, switch $S_3$ by depressing the push-button $s$ (which energizes the closing winding ES) or $t$ (which energizes the opening or tripping winding DS), respectively.

In order to obtain immediately a cycle such that series switch $S_3$ would open if an endeavour were made to connect a feeder line $L_3$ containing a fault, it suffices to provide a relay the winding $w_0$ of which is in parallel with winding ES when push-button $s$ is depressed and the contact $w_1$ of which, open in the state of rest, ensures, when it is closed, the energizing of winding $f_0$ and therefore energizes relay $f$. Everything takes place as if one were at the end of a first period of operation of the sequential relays of system P: relay F being energized, an opening order, resulting from the occurrence of a fault, is immediately sent toward winding $i_0$, and relay $i$, which is energized, controls, as above explained in the case of permanent faults, the automatic opening of switch $S_3$ after closing of the pole or poles of circuit-breaker C where a fault has occurred. Consequently, a deliberate closing of $S_3$ in order to obtain a feeder line connection is very quickly followed by an automatic opening of $S_3$ if there is a fault in said feeder line $L_3$.

It has been explained, mainly with reference to FIG. 2, how it is possible to obtain, owing to a directional relay N$d$ and to a locking relay $e$ provided at every station and on lines $v_I$ and $v_{II}$, a single-pole control of the shunt circuit-breaker C and a multipole control of the series switch $S_3$ at both ends of a line in which a fault has occurred.

According to a modification, it is possible to obtain the simultaneous grounding, at both ends, of a faulty feeder line by means of a device illustrated by FIG. 3. In this figure, the same references have been used as in FIGS. 1 and 2 for corresponding elements, the relay systems N, P, R and Q being merely shown in the form of blocks. Transmission of the synchronization orders between the two ends of feeder line $L_3$ is obtained through high frequency carrier currents transmitted through one of the phases (phase $c$) of the feeder line, instead of being transmitted through a pilot wire $v$ including lines $v_I$ and $v_{II}$ as in the case of FIG. 2.

For this purpose, the synchronization orders leave every sequential system N and enter it through a cable V coupled to phase $c$ of feeder line $L_3$ through a coupling capacitor CV, the synchronization high frequency currents being prevented from reaching feeder line $L_3$ and in particular relays TI$_c$ and TV$_c$ by line traps CB acting as high frequency rejector filters or circuits (because they are tuned to offer a high impedance to the carrier high frequency and a negligible impedance to the industrial current at 50–60 periods), whereas capacitors CV serve partly to reject the industrial frequency. Furthermore, the ground connection of line V is obtained through a rejector circuit CR tuned in the same manner as circuits CB to the carrier high frequency, which enables the industrial frequency current that has flown past capacitor CV to flow toward the ground without involving any notable loss of high frequency current.

With the exception of the means for transmitting synchronizing and locking signals, the embodiment of FIG. 3 is identical to that of FIGS. 1 and 2.

*Second type of embodiments (with a set of operating busbars)*: FIGURES 4, 5, 6, 7 and 8

Figure 4:
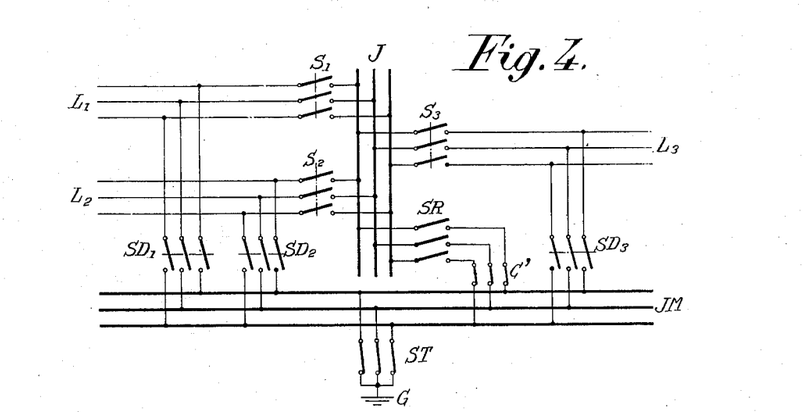
FIG. 4 diagrammatically illustrates a second embodiment, with control through a busbar set, of a device according to the invention.

FIG. 4 shows a second embodiment of the invention in which there is provided a set of auxiliary or operating busbars JM in addition of the main set of busbars J to which the feeder lines $L_1$, $L_2$, $L_3$ are connected through isolating switches $S_1$, $S_2$, $S_3$ of the multipole control type. These feeder lines may also be connected, for effecting operations, to the busbar set JM through switches SD$_1$, SD$_2$, SD$_3$. In this embodiment, the single-pole automatic control shunt circuit-breaker C' intended to eliminate single, two or three-phase faults, either transient or permanent, is disposed between the two sets of busbars and it is combined with a single-pole control switch SR mounted in series with it and with a ground switch ST also of the single-pole control type provided between the auxiliary busbar set JM and the ground G, to permit of grounding the faulty phase or phases.

The automatic controls for eliminating transient faults by grounding for a portion of a second the phase or phases of the busbar set J corresponding to the phase or phases of a feeder line, such as $L_3$ connected to this set of busbars, in which a fault has occurred, are produced in this case, circuit-breaker C' and switch ST being normally closed, by the closing of the faulty phase or phases of shunt switch SR (which grounds said phase or phases), followed after a very short time (a portion of a second) by the opening of said phase or phases in circuit-breaker C'. It is found that this double automatic control can be obtained by the same systems of fault detecting transformers TV and TI and of relays N, P, Q as in the embodiment of FIG. 2. However, it should be noted that the ground is connected with the set of busbars JM due to the fact that ST is normally closed and that SR and C′ of FIG. 3 play the same part as C in FIG. 2. It will therefore suffice to cause windings EC$a$, EC$b$, EC$c$ to act each upon the corresponding pole of switch SR and to cause windings DC$a$, DC$b$, DC$c$ to act each upon the corresponding pole of circuit-breaker C′. The fault having been cleared, switch SR opens and the circuit-breaker is closed because their closing and opening windings, respectively, are no longer fed with current and the parts are returned to the initial position. As for the control of switch $S_3$ in case of permanent fault, it may also be obtained through the protective means of FIG. 2, in particular by means of unit R.

It will be noted that the set of auxiliary busbars JM and switches $SD_1$, $SD_2$, $SD_3$ also permit of effecting some operations after opening of switch ST so as to isolate the set of busbars JM from the ground. For instance, in order to disconnect a feeder line such as $L_1$, it suffices to effect deliberately the following operations if it is supposed that $S_1$ and $S_T$ are closed whereas $SD_1$ is open (of course SR is open and C′ closed to permit of dealing with a possible fault):

Opening of ST,
Closing of SR,
Closing of $SD_1$,
Opening of $S_1$ the terminals of which are not under voltage, because $L_1$ is also connected with J through $SD_1$, JM, C′ and SR which are closed,
Opening of C′ which is subjected to a voltage; it is the high breaking capacity circuit-breaker which performs the disconnection under voltage,
Opening of SR,
Closing of C′ and of ST, with a return of the parts to the initial state (with the exception of $S_1$ which is now open).

These various operations are effected simultaneously in the three phases through deliberate controls, for instance by depressing push-buttons so as to energize the closing and opening windings of elements $S_1$, $SD_1$, ST, C′ and SR in the same manner as push-buttons $s$ and $t$ were acted upon to energize the windings ES and DS in the arrangement of FIG. 2.

It will therefore be seen that only circuit-breaker C′ must have a high breaking capacity, because it may serve to perform either deliberate circuit-breaking (for operations) or automatic operations (after the grounding serving to eliminate transient faults).

Another embodiment of the automatic control of elements SR, C′ and $S_3$ to eliminate the faults will be hereinafter described in a detailed manner with reference to FIGS. 6, 7 and 8. But before this we will describe, with reference to FIG. 5, a possible adaptation of the construction of FIG. 4 to a station having two main busbar sets $J_1$ and $J_2$.

Figures 5, 6:
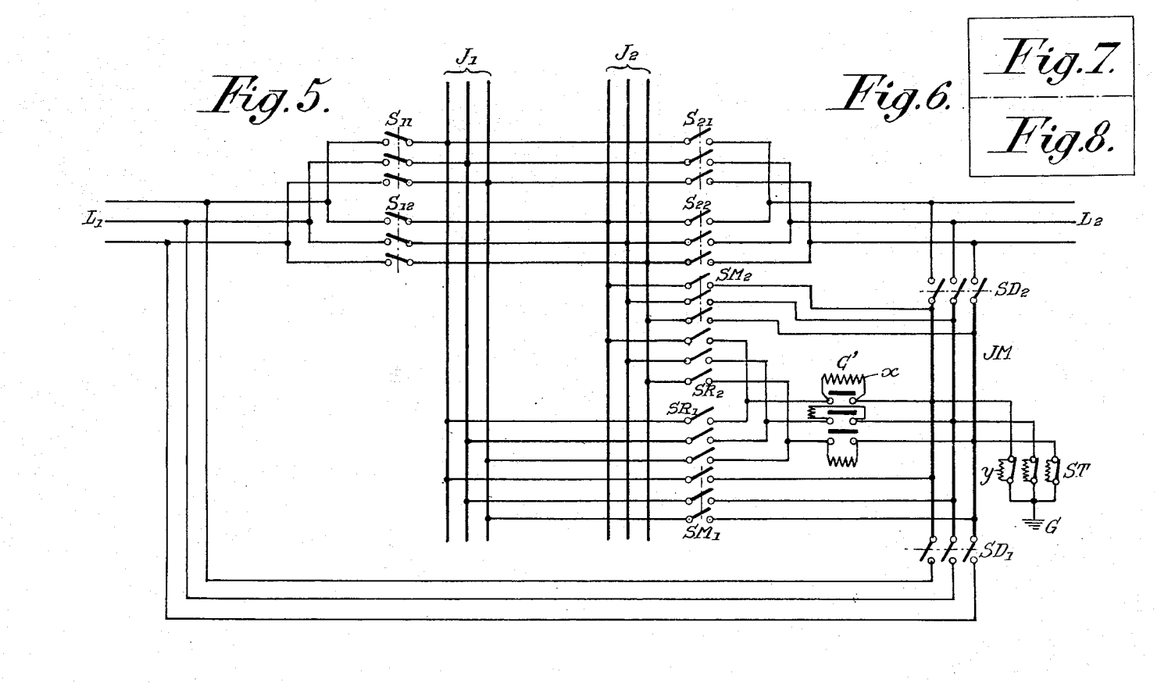
FIG. 5 shows a modification including two barbar sets in addition to the control busbar set of the embodiment according to FIG. 4.
FIG. 6 shows the assembly of FIGS. 7 and 8, illustrating in detail the embodiment of FIG. 4.

FIG. 5 diagrammatically illustrates a station having two main busbar sets $J_1$ and $J_2$ to each of which may be connected one of the feeder lines $L_1$ or $L_2$, through isolating switches $S_{11}$, $S_{12}$, $S_{21}$, $S_{22}$. Likewise, the high breaking capacity and single-pole control circuit-breaker C′ may be connected to each of the busbar sets $J_1$ and $J_2$ through a single-pole isolating switch $SR_1$, $SR_2$. As in the embodiment of FIG. 4, the station comprises an auxiliary busbar set JM normally connected to the ground G through a grounding switch ST which is normally closed, this busbar set JM being adapted to be connected to each of the feeder lines $L_1$, $L_2$ through a contactor $SD_1$, $SD_2$.

In order to permit a direct coupling of each of the main busbar sets $J_1$, $J_2$ with the auxiliary busbar set JM, switches $SM_1$ and $SM_2$ are provided.

Figure 7:
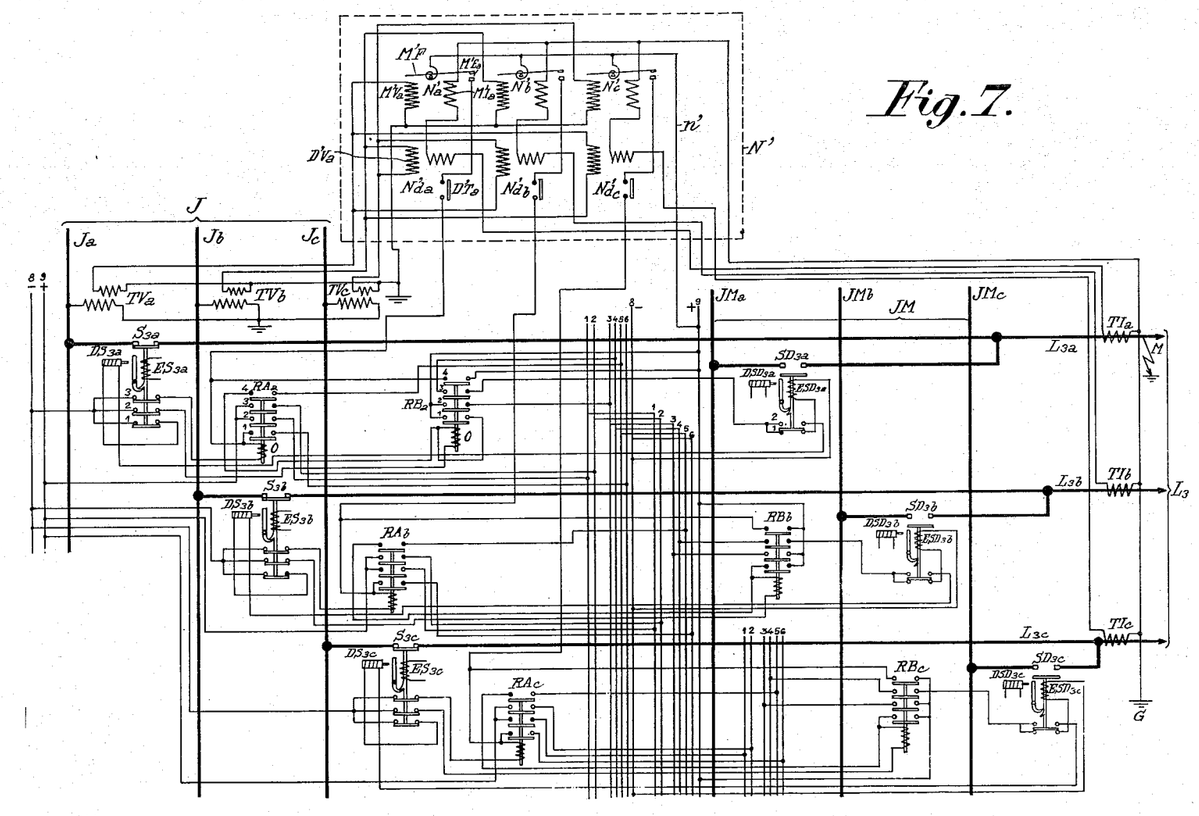

The operation of the device of FIG. 5, in the case of a fault, is identical to that of FIG. 4, with the difference that the protective means for eliminating a transient fault close the faulty phase or phases of the switch $SR_1$ or $SR_2$ connected to the main busbar set $J_1$ or $J_2$ to which feeder line $L_1$ or $L_2$, where the fault has occurred, is branched (this selection may take place merely by mounting voltage transformers TV, no longer in lines L, as in the arrangement of FIG. 2, but in the main busbar sets, as illustrated by FIG. 7 in the case of a single busbar set) and likewise, for the elimination of a permanent fault in feeder line $L_1$, open the three phases of switch $S_{11}$ or $S_{12}$ connected to said busbar set $J_1$ or $J_2$ (the selection being also effected by such a mounting of the voltage transformers).

It will be noted that FIG. 5 shows discharge resistors $x$ connected in shunt with the poles of circuit-breaker C′, the adjunction of such resistors being possible due to the presence of switches $SR_1$, $SR_2$. In a likewise manner, we have shown resistors $y$ of high value for shunting the poles of isolating switch ST and stabilizing the potential of busbar set JM when ST is open to permit a deliberate decoupling operation of the type above indicated with reference to FIG. 4.

Of course, resistors such as $x$ and $y$ may also be provided in the embodiment of FIG. 4 (which includes an isolating switch SR). Furthermore, in the embodiment of FIGS. 4 and 5, resistors such as $x$ and $y$ might be replaced by arrestors.

Figure 8:
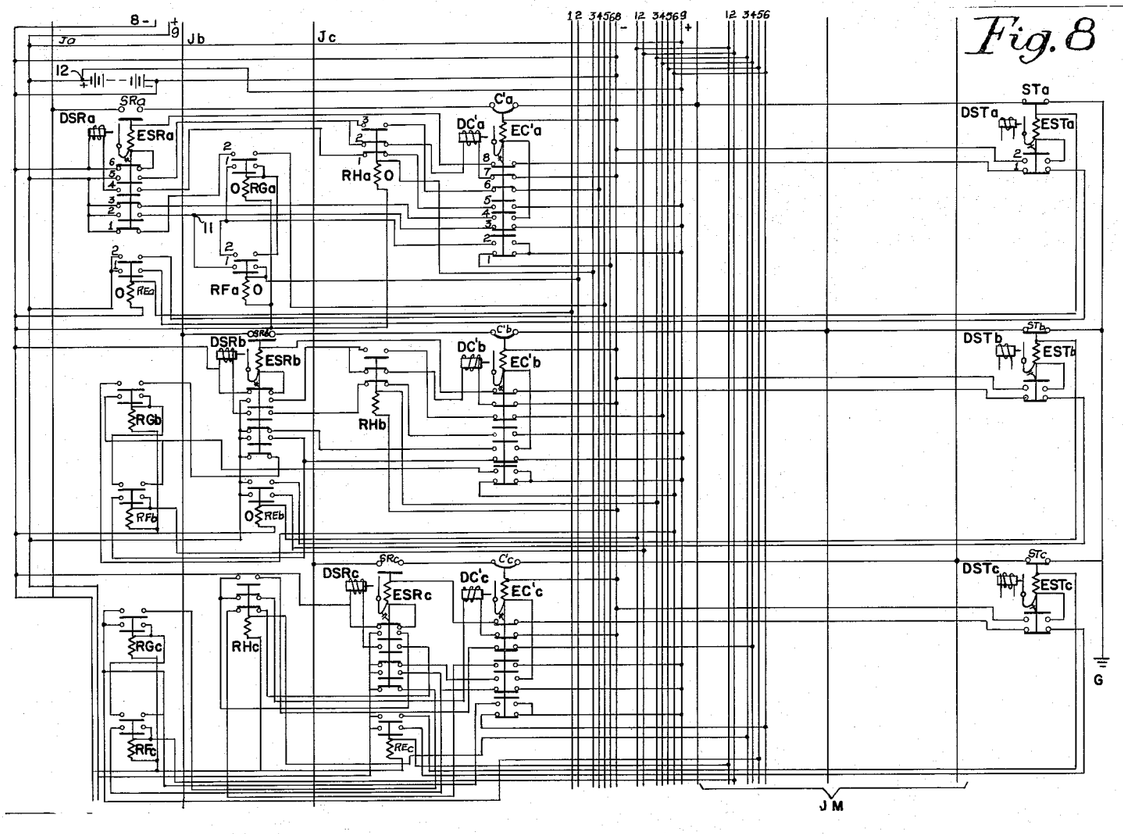

FIGS. 7 and 8, which are to be assembled together as indicated by FIG. 6, illustrate a protective system corresponding to the station arrangement of FIG. 4 and which may also be adapted to that of FIG. 5 due to the fact that the voltage transformers TV are disposed in the main busbar set.

FIGS. 7 and 8 show the same elements as FIG. 4, to wit the main busbar set J (bars J$a$, J$b$ and J$c$), the auxiliary or operating busbar set JM (bars JM$a$, JM$b$, JM$c$), one of the feeder lines L, for instance $L_3$ (conductors $L_{3a}$, $L_{3b}$, $L_{3c}$), three-pole coupling switches $S_3$ and $SD_3$ (poles $S_{3a}$, $S_{3b}$, $S_{3c}$ and $SD_{3a}$, $SD_{3b}$, $SD_{3c}$), single-pole control switch SR (poles $SR_a$, $SR_b$, $SR_c$), circuit-breaker C′ having a high breaking capacity and of the single-pole control type (poles C′$a$, C′$b$, C′$c$) and switch ST (poles ST$a$, ST$b$, ST$c$) for connection with the ground at G.

The protective means include for each of the phases (indexes $a$, $b$, $c$ indicating the respective phases):

A voltage transformer TV branched on a main bar J,
A current transformer TI branched on a conductor $L_3$,
A relay N′ of the definite impedance relay type, that is to say a relay comprising a lever M′F urged in a first direction by a winding M′V disposed in the secondary circuit of voltage transformer TV, and in a second direction by a winding M′I disposed in the secondary circuit of the current transformer TI, this lever M′F being balanced (possibly by a spring) to occupy the position shown by the drawing when normal conditions are prevailing in feeder line $L_3$. On the contrary, it comes to close contact M′I when a fault occurs in feeder line $L_3$ (the impedance, i.e. the voltage to current ratio, drops below a given value);

A directional relay N′$d$ with its two windings D′V (mounted between the two other phases of the secondary circuits of the voltage transformers) and D′I (mounted in series with winding M′I in the secondary circuit of the same phase of the current transformer), and its contact D′T which closes when a fault occurs in the corresponding phase; of course, instead of using three directional relays N′$d_a$, N′$d_b$, N′$d_c$ for the three phases, one might use a single directional relay such as that illustrated at N$d$ on FIG. 2, provided that it is placed on the common line feeding the three levers M′F in parallel; relays N′$a$, N′$b$, N′$c$ and N′$d$ for the three phases constitute a system N′ analogous to the system N of FIG. 2;

In a sequential system P′ of relays playing the same part as the system P of FIG. 2, (1) Two primary relays RA and RB associated with switch $S_3$, (2) Four secondary relays RE, RF, RG and RH associated with switches SR and ST and with circuit-breaker C', each of the relays including a control winding indicated by index O and several contacts indicated by indexes 1, 2, 3, 4, 5, 6, 7, 8; relays RB and RH operate only in case of permanent fault;

Closing windings $ES_3$, ESD, ESR, EC', EST for closing elements $S_3$, SD, SR, C', ST respectively and opening windings $DS_3$, DSD, DSR, DC', DST for tripping elements $S_3$, SD, SR, C', ST respectively, the whole of these windings corresponding substantially to units Q and R of FIG. 2.

The automatic operation of the device of FIGS. 6, 7 and 8 in order to eliminate transient or permanent faults of any type is as follows.

(1) Operation in the case of a single-phase transient fault (for instance in phase a of feeder line $L_3$, that is to say in conductor $L_{3a}$ as illustrated at M). The existence of a fault at M has for its effect to close contacts M'E$a$ and D'T$a$, which energizes (through line $n'$, contacts M'E$a$ and D'T$a$ closed by the fault and the auxiliary contact 3 of switch $S_{3a}$) the winding O of relay RA$a$. The energizing of this relay acts as follows:

Through its contact 1, it maintains its energizing through the intermediate of control bar 6 (we have illustrated six control bars 1, 2, 3, 4, 5, 6 each divided into three vertical sections electrically connected together) and of the auxiliary contact 1 of the pole C'$a$ of circuit-breaker C' (which is normally closed as above indicated with reference to FIG. 4); therefore, relay RA$a$ remains energized until the opening of pole C'$a$;

Through its contact 2, it sends the + polarity to the control bar 1, which energizes relay $RE_a$;

Through its contact 3, it sends the + polarity to the control bar 2, which energizes relay $RF_a$;

Through its control 4, it connects the winding O of relay $RB_a$ to the control bar 5 which, for the present time, has no effect because this bar is not connected to the positive bar 9.

The energizing of relay $RE_a$ by the contact 2 of relay $RA_a$ acts as follows:

Through its contact 2, it energizes the closing winding $EST_a$ of the pole $ST_a$ of the grounding switch ST in the case where it is not closed, for instance after a manual operation (as a matter of fact, as above explained with reference to FIG. 4, switch ST is normally closed, but it may be opened manually for some operations);

Through its contact 1, it energizes the closing winding $ESR_a$ of the pole $SR_a$ of switch SR (normally open) through the following auxiliary contacts: contact 1 of the closed pole $ST_a$, contact 8 of the closed pole C'$a$ and contact 6 of the open pole $SR_a$; it will be noted that winding $ESR_a$ is energized only if switches SR and ST and circuit-breaker C' are in their normal state as above indicated; the pole $SR_a$ of switch SR, being operated, therefore closes.

The energizing of relay $RF_a$ by the contact 3 of relay $RA_a$ produces the following effects:

Through its contact 1, it keeps relay $RF_a$ energized through the auxiliary contact 3 of the closed pole C'$a$ of circuit-breaker C' and the auxiliary contact 2 of the closed pole $SR_a$, these contacts being mounted in parallel between point 11 and the positive terminal 12 (through positive lines 9); relay $RF_a$ will therefore remain energized until pole $SR_a$ is reopened (which will take place after the opening of pole C'$a$);

Through its contact 2, it prepares the energizing of relay $RG_a$ through the intermediate of the auxiliary contact 2 of the pole C'$a$, since relay $RG_a$ is to be energized as soon as this pole is opened.

The closing of the pole $SR_a$ of switch SR (controlled as indicated when describing the function of relay $RE_a$) causes the closing of its auxiliary contact 5 which sends the + polarity to the opening winding DC'$a$ of the pole C'$a$ of the circuit-breaker through the intermediate of the auxiliary contact 7 of this pole and of the contact 2 of relay $RH_a$ which, at the present time, is not energized. The energizing of winding DC'$a$ produces the opening of pole C'$a$. In this case, the time for which the faulty phase is grounded is determined by the time of operation or tripping of the poles of the circuit-breaker C'. If the construction thereof is such that this duration does not reach a value of 2 or 3 periods of current, we may provide a supplementary time-lag relay (not shown) producing a lag between the time when the pole of the switch $SR_a$ closes and the time of opening of the circuit-breaker pole C'$a$ after the opening winding DC'$a$ thereof is energized.

The opening of the pole C'$a$ of circuit-breaker C (controlled as above indicated) produces the following results:

The closing of its auxiliary contact 5 which energizes, through the contact 1 of relay $RH_a$ (which is still not energized) and of the auxiliary contact 4 of pole $SR_a$ (closed), the opening winding $DSR_a$ of pole $SR_a$ which is going to open;

The closing of its auxiliary contact 2 which energizes, through the intermediate of the contact 2 of relay $RF_a$, relay $RG_a$ which is fed locally between lines 8 and 9 through its contact 1 and the auxiliary contact 2 of pole C'$a$; relay $RG_a$ therefore remains energized as long as the pole remains open.

Relay $RG_a$ sends, through its contact 2 and the auxiliary contact 1 of pole $SR_a$ (which is now once more open) the + polarity from bar 9 to control bar 5.

The single-phase fault M, which is supposed to have been transient, has been cleared by grounding the faulty phase (generally at both of its ends), and contact M'E$a$ has opened during the grounding or immediately thereafter, and anyway before the opening of the circuit-breaker pole $SR_a$. Therefore relay $RA_a$ is deenergized when the + polarity is sent to control bar 5 through relay $RG_a$ as above indicated and consequently when the contact 4 of relay $RA_a$ is opened. Therefore winding O of relay $RB_a$ is not energized by the transmission of this + polarity to bar 5.

On the other hand, relay $RE_a$ is deenergized due to the opening of the contact 2 of relay $RA_a$. As for relay $RF_a$, it is deenergized as soon as the pole $SR_a$ of switch SR is opened.

Furthermore, the opening of pole $RS_a$ produces, through the closing of its contact 3 and through the intermediate of the auxiliary contact 4 of the open pole C'$a$, energizing of the closing winding $EC'_a$ of pole C'$a$ which will therefore close. The closing of pole C'$a$ causes, due to the opening of its auxiliary contact 2, deenergizing of relay $RG_a$.

Consequently, in order to eliminate a transient fault in phase a, relay $RA_a$, $RE_a$ and $RF_a$, $RG_a$ have first been successively energized then deenergized, windings $ESR_a$, $DC'_a$, $DSR_a$ and $EC'_a$ having successively actuated the pole of switch $SR_a$ and the pole of switch C'$a$ ($ST_a$ being supposed to be initially closed). On the contrary, relays $RB_a$ and $RH_a$ have not been energized.

(2) Operation in the case of a single-phase permanent fault (for instance at M). The first operations above indicated under (1) first take place because a permanent fault is not immediately distinguished from a transient fault; it is only when the pole C'$a$ of circuit-breaker C' is opened that the nature of the fault appears. As a matter of fact, if the fault is permanent, the contacts ME'$a$ and D'R$a$ of the unit N' remain closed or close immediately thereafter, anyway before the deenergizing of relay $RG_a$ responsive to the reclosing of pole C'$a$. Consequently, when the fault is permanent, the contact 4 of relay $RA_a$ (which remains energized or is reenergized) is closed when the + polarity is sent to control bar 5 through relay $RG_a$ and consequently permits the energizing of the winding O of relay $RB_a$ (it will be reminded that in the case of a transient fault the contact 4 of relay $RA_a$ opens before the + polarity is sent to bar 5 and that consequently the winding O of relay $RB_0$ is not energized).

The energizing of relay $RB_a$ produces the following results:

Through its contact 1, it keeps this relay energized through the intermediate of the auxiliary contact 2 of pole $S_{3a}$;

Through its contact 2, it sends the + polarity to control bar 3, which energizes relay $RH_a$;

Through its contact 3, it prepares the control circuit for closing the pole $SD_a$ of switch SD and for opening the pole $S_{3a}$ of switch $S_3$ through the intermediate of control bar 4;

Through its contact 4, it energizes relay $RAa$ (in parallel with the feed thereof through contacts $M'E_a$ and $D'T_a$) so as to confirm the order of performing a second cycle.

As soon as pole $C'a$ is again closed, the closing of the switch pole $SR_a$ is controlled as in the first cycle, but due to the fact that relay $RH_a$ is now energized (whereas it was not during the first cycle), the closing of the auxiliary contact 5 of switch $SR_a$ sends the + polarity, no longer to the opening winding $DC'_a$ of pole $C'a$, but to control bar 4 through the auxiliary contact 6 of pole $C'a$. This polarity then controls, through the contact 3 of relay $RB_a$, the energizing of the closing winding $ESD_{3a}$ of the pole $SD_{3a}$ through its auxiliary contact 1. The closing of this pole has for its effect to energize, through the auxiliary contact 1 of the switch pole $S_{3a}$ and through the contact 3 of relay $RB_a$, the tripping winding $DS_{3a}$ of pole $S_{3a}$.

The opening of pole $S_{3a}$ produces, due to the opening of its auxiliary contacts 2 and 3, the deenergizing of relays $RA_a$ and $RB_a$. The cycle then goes on as in the case of a single-phase transient fault, once relay $RH_a$ has been deenergized by the opening of the contact 2 of relay $RB_a$. At the end of this second cycle, all the relays are again in the initial state of rest and a single-phase permanent fault in phase $a$ is thus eliminated in two cycles, the first including the initial steps of the cycle of the elimination of a single-phase transient fault and the second one including the operation of relays $RB_a$ and $RH_a$ which serve to close the pole $SD_{3a}$ and the opening of pole $S_{3a}$. The opening of pole $SD_{3a}$ may be obtained for instance by a manual operation (by acting upon a push-button controlling the opening winding $DSD_{3a}$).

(3) Operation in case of a two-phase or three-phase, transient or permanent fault. The operation is the same as in the case of a single-phase fault of the same kind, with the exception that the operations involve two or three phases simultaneously.

(4) Manual operations. FIGS. 7 and 8 show the closing windings $ES_3$ of the switch $S_3$ and the opening windings $DST_a$ of the switch ST which permit manual operations, same as opening windings $DSD_3$.

It will be noted that it is possible to energize in parallel the three closing windings on the one hand, and the three opening windings on the other hand, of each of the switches $S_3$, $SD_3$ and $ST_3$ which may be of the multipole control type, whereas switch SR and circuit-breaker C' have a phase by phase control. In a modification, SR and C' might constitute a single unit C as in the case of the embodiments of FIGS. 1 to 3.

Figure 9:
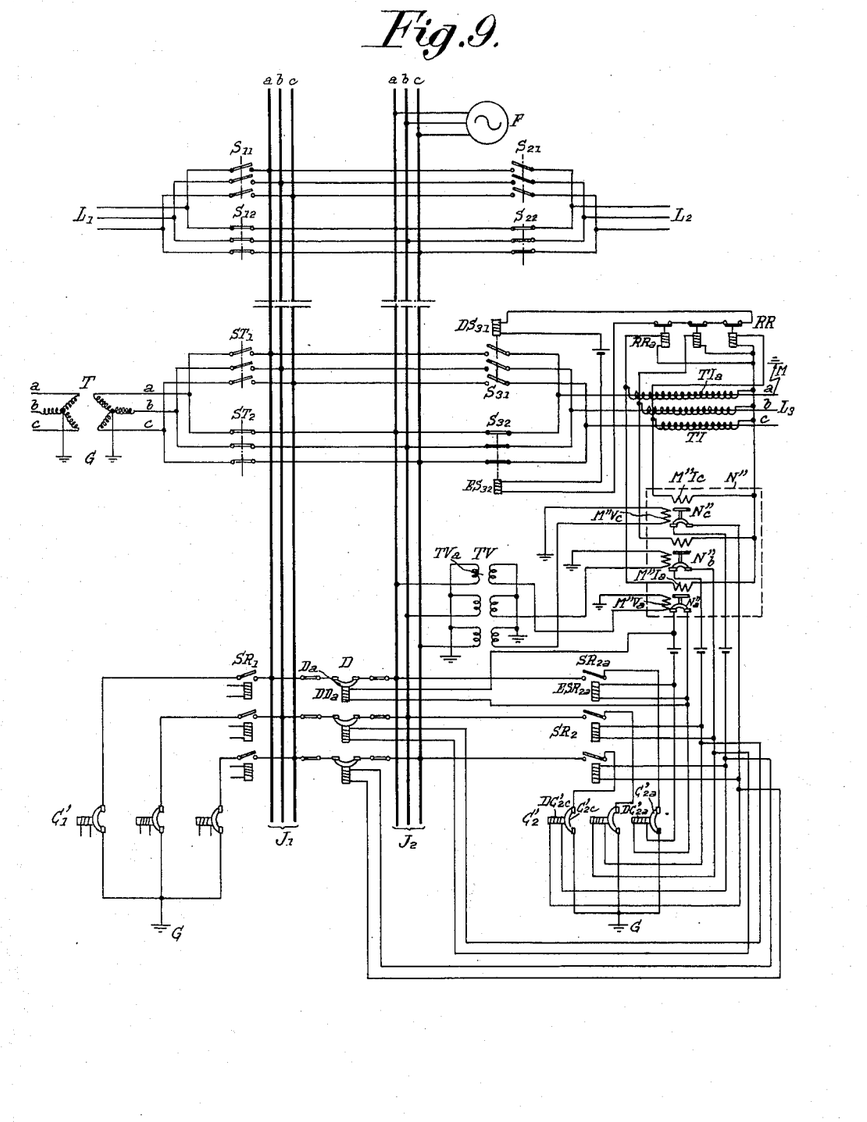
FIG. 9 illustrates a third embodiment of the invention with two main busbar sets including each its own circuit-breaker with single-phase control for grounding.

*Third type of embodiments (with two main busbar sets):*
FIGURE 9

Up to the present time it has been supposed that only feeder lines $L_1$, $L_2$, $L_3$, etc. were connected to busbar sets J, $J_1$, $J_2$, etc. But it happens often that other elements (transformers, current generators) are connected to the sets of busbars. Now, if some modern tranformers may without risk be grounded at the same time as a line where a fault has occurred if this transformer and this line are connected to the same set of busbars, there are also transformers which cannot be grounded without risk.

In this case, it is possible within the scope of the present invention to provide (FIG. 9) two main sets of busbars $J_1 \cdot J_2$ to which may be connected the lines $L_1$, $L_2$, $L_3$ and the transformer T through isolating switches $S_{11}$, $S_{12}$, $S_{21}$, $S_{22}$, $S_{31}$, $S_{32}$, $S_{T1}$, $S_{T2}$, each of these busbar sets being adapted to be grounded at G through a circuit-breaker $C_1$, $C_2$ having a high breaking capacity and of the single-pole control type, possibly in series with an isolating switch $SR_1$, $SR_2$ also of the single-pole control type. Furthermore, we provide between the two main busbar sets $J_1$ and $J_2$ a circuit-breaker D also preferably of the single-pole control type making it possible to uncouple, in case of a fault, the faulty phase or phases of the two sets of busbars, this uncoupling taking place through suitable means hereinafter indicated, before grounding the set of busbars (for the phase or phases where the fault has occurred) to which is then connected the line where the fault has occurred, the transformer having besides been connected to the other set of busbars (if it were not already connected thereto) before this grounding in such manner that, owing to this connection and to the uncoupling through the open circuit-breaker D, the transformer is not grounded at the same time as the line where a fault has occurred.

On FIG. 9 we have diagrammatically shown:

The relay Unit N'' detecting the faults in line $L_3$, in cooperation with voltage transformers TV and current transformers TI, this unit (which is similar to the units N of FIG. 2 and N' of FIG. 7) essentially including three relays N''$a$, N''$b$, N''$c$ each of which is actuated by a winding M''V$a$–M''V$c$ disposed in the secondary of a phase (such as TV$a$) of the voltage transformer TV and by a winding M''I$a$–M''I$c$ disposed in the secondary of a phase (such as TI$a$) of the current transformer TI;

The closing windings, such as $ESR_{2a}$, of the different poles of isolating switches $SR_2$ and $SR_1$, the closing windings, such as $DC'_{2a}$, of the different poles of circuit-breakers $C'_2$, $C'_1$, and the opening windings, such as $DDa$, of the different poles of the circuit-breaker D, which is of the single-pole control type (phase by phase), same as circuit-breakers $C'_1$ and $C'_2$ and the isolating switches $SR_1$ and $SR_2$;

The means for controlling isolating switches $S_{31}$, $S_{32}$ for connection and disconnection of feeder line $L_3$ with respect to the busbar sets $J_1$, $J_2$, these isolating switches being of the multipole control type (the three phases together) through opening or tripping windings such as $DS_{31}$ and closing windings such as $ES_{32}$ under control of a system RR of relays such as $RRa$ (one for every phase).

The operation of the device of FIG. 9 is as follows:

During normal supervising period (when no deliberate operation is being performed), circuit-breakers D, $C'_1$ and $C'_2$ are closed whereas isolating switches $SR_1$ and $SR_2$ are open as shown.

The fault M is detected by relay N'' $a$ which closes its contact, which has for its effect successively:

To energize the opening time-lag winding $DDa$, which opens the pole $Da$ with a time-lag $t_1$;

To energize the closing time-lag winding $ESR_{2a}$, which closes the pole $SR_{2a}$ with a time-lag $t_2$ greater than $t_1$ and connects with the ground the bar $a$ of the set of busbars $J_2$, without grounding the bar $a$ of the set of busbars $J_1$ because pole $Da$ is now open;

To energize the opening time-lag winding $DC'_{2a}$, which opens, with a time-lag $t_3$ greater than $t_2$ by a fraction of a second (for instance $\frac{1}{20}$ of a second), the pole $C_{2a}$ after grounding the phase $a$ of line $L_3$ for a time $t_3-t_2$ sufficient to eliminate fault M if it is a transient fault.

Then $Da$ can close, $SR_{2a}$ open and $DC'_{2a}$ close to return into their initial position so as to be able to deal with a new fault.

The operation is the same in the case of a two-phase or three-phase fault, the closing and opening operations then interesting the two or the three faulty phases, respectively.

Of course, we provide in the device of FIG. 9 relays (not shown) of the type of those shown in the devices of FIGS. 2 and 7 and 8 for automatically disconnecting feeder line $L_3$ by opening of switch $S_{32}$ if the single-, two- or three-phase fault is permanent.

It is found that, owing to the discoupling of the two sets of busbars $J_1$ and $J_2$ by circuit-breaker D, for the faulty phase or phases, transformer T is not grounded at the same time as feeder line $L_3$ and the other lines connected to this busbar set (for the faulty phase or phases) if T and $L_3$ are connected at the time of the fault to two different busbar sets. In the contrary case, that is to say if $S_{T2}$ is closed and $S_{T1}$ is open (as shown) and furthermore if it is desired to avoid grounding the source of voltage F (generator) directly connected with the busbar set $J_2$, it suffices to effect, before beginning to deal with the faults in feeder line $L_3$, the transfer of this line from the busbar set $J_2$ (to which are connected T and F) to the busbar set $J_1$. For this purpose the winding of every relay such as $RRa$ is arranged in the secondary of one of the current transformers, (such as $TIa$) in such manner that when there is a fault in feeder line $L_3$ windings $DS_{31}$ and $ES_{32}$ are deenergized, which closes $S_{31}$ and opens $S_{32}$, thus producing the transfer of line $L_3$ to the busbar set $J_1$, this operation taking place as soon as the fault appears, even before the energizing of the time-lag winding such as $DDa$ of the circuit-breaker D.

Circuit-breaker D may also serve, in the known manner, to perform the wilful operations by being inserted in series between a line L and a set of busbars J. For instance in order to disconnect line $L_1$ (under voltage) from source F (an operation for which it is not possible to make use of isolating switch $S_{22}$ which has only a low breaking capacity), it suffices to perform the following operations (by acting for instance one of the push-buttons which actuate the closing or tripping windings (not shown) of the above mentioned isolating switches and circuit-breakers):

Closing of $SR_1$;

Opening of $S_{22}$ without voltage at the terminals, because D and $S_{21}$ are closed;

Opening of D under voltage;

Opening of $S_{21}$, which disconects line $L_2$ at the high voltage station illustrated by FIG. 9.

It will be noted that in order to ensure the grounding of a main set of busbars $J_{I'}$ $J_{II}$, $J_1$, $J_2$ either directly (FIGS. 1, 2, 3 and 9), or through a set of operating busbars JM normally grounded by an isolating switch ST (FIGS. 4, 5 and 6 to 8), we have recourse to circuit-breaker means which may be constituted either by a single single-pole circuit-breaker (with phase by phase control) having a high breaking capacity $C_I$, $C_{II}$, C (FIGS. 1, 2, and 3) or by a series arrangement of such a circuit-breaker C', $C'_1$, $C'_2$ and of an isolating switch SR, $SR_1$, $SR_2$ (also of the single-pole control type, FIGS. 4, 5 and 6 to 8), the series arrangement of a switch and of a circuit-breaker being equivalent to a single circuit-breaker.

On the other hand, it has been explained that grounding takes place simultaneously at both ends of the line in which a fault has occurred, for the faulty phase or phases. This condition is essential in the general case for lines of great length (greater for instance than 100 miles). On the contrary, when the line is short (or when the fault has occurred in a long line and at a short distance from a station provided with a protective device according to the invention), it suffices to ground only the end of the line connected to a station (or in the station near which the fault has occurred) by having recourse to a protective system of the type operating from a distance.

A device according to the invention has a great number of advantages and in particular:

(1) It ensures the continuity of supply, and this even for radial distribution systems, least in the case of single-phase faults;

(2) It ensures an automatic very quick clearance of the transient faults (arcs) without establishing residual arcs;

(3) It permits an automatic and quick disconnection of lines through which a permanent fault has occurred;

(4) It permits of transforming at low cost high voltage stations having series circuit-breakers of the three-pole control type between every line and the set busbars of the station when it is desired to increase the power of the station and/or to obtain single-pole control operations; it suffices to incorporate at every station a single new circuit-breaker having a high breaking capacity and of the single-pole control type at $C_I$ and $C_{II}$ as shown on FIG. 1, the other low breaking capacity circuit-breakers then playing the part of the isolating switches $S_1$, $S_2$ $S_{3I}$, $S_{3II}$, $S_4$ and $S_5$;

(5) It ensures a very long service for high breaking capacity circuit-breakers due to the fact that they are subjected to voltage only when there is a fault or during some operations, that is to say very rarely and during very short periods; on the contrary, the ordinary circuit-breakers are constantly subjected to the effect of voltage;

(6) It permits of utilizing circuit-breakers calculated to cut only the voltage difference between phase and ground, for instance 220,000 volts for lines where the voltage between the phases is 380,000 volts.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

This application is a continuation-in-part of our U.S. patent applications Ser. No. 492,834, filed March 8, 1955, and Ser. No. 636,024, filed January 24, 1957.

What we claim is:

1. At a station of a polyphase electric power transmission and distribution system including a plurality of polyphase lines, a protective switch gear which comprises, in combination, a main busbar set, a plurality of isolating switches for connecting said lines with the busbars of said set, respectively, polyphase single-pole control circuit-breaking means of high breaking capacity connected between said busbar set and the ground and normally open, protective control means responsive to variations in the electrical conditions in each phase of each of said lines for closing the corresponding pole of said circuit-breaking means, an auxiliary busbar set connected between said high breaking capacity circuit-breaking means and the ground, a grounding isolating switch connected between said auxiliary busbar set and the ground, a connecting line between said auxiliary busbar set and each of said polyphase lines, and an auxiliary isolating switch in each of said connecting lines.

2. At a station of a polyphase electric power transmission and distribution system including a plurality of polyphase lines, a protective switch gear which comprises, in combination, a main busbar set, a plurality of isolating switches for connecting said lines with the busbars of said set, respectively, polyphase single-pole control circuit-breaking means of high breaking capacity connected between said busbar set and the ground and normally open, said circuit-breaking means comprising a single-pole control circuit-breaker and a single-pole control second isolating switch in series with said circuit-breaker, and protective control means responsive to variations in the electrical conditions in each phase of each of said lines for closing the corresponding pole of said circuit-breaking means, said control means being arranged to control the pole of both said second isolating switch and said circuit-breaker corresponding to the phase of the line in which a fault is detected.

3. At a station of a polyphase electric power transmission and distribution system including a plurality of polyphase lines, a protective switch gear which comprises, in combination, a pair of main busbar sets, a plurality of isolating switches for connecting each of said lines with either of said main busbar sets, a single-pole control circuit-breaker of high breaking capacity and normally open, a series of further isolating switches arranged to connect said circuit-breaker respectively to each of said main busbar sets, and protective control means responsive to variations in the electrical conditions in each phase of each of said lines for closing the corresponding pole of said circuit-breaker.

4. For use in a polyphase electric power transmission system comprising a plurality of polyphase lines having the neutral thereof directly connected to ground, a protective gear which comprises, in combination, at least one polyphase busbar set, polyphase switch means of relatively low breaking capacity and of the multipole type inserted between said busbar set and each of said lines, polyphase circuit-breaking means of relatively high breaking capacity and of the single-pole control type connected in shunt between said busbar set and the ground, protective control means responsive to a fault occurring in at least one phase of any of said polyphase lines for closing the corresponding phase of said circuit-breaking means during a fraction of a second, and further protective control means responsive to the presence of a fault in at least one phase of any of said polyphase lines after the end of the period of closing of the corresponding phase of said circuit-breaking means for opening all phases of said switch means between said busbar set and the polyphase lines in which the presence of a fault was detected.

5. For use in a polyphase electric power transmission system comprising a plurality of polyphase lines having the neutral thereof directly connected to ground through a compensation circuit element of insufficient impedance to neutralize, in the case of a ground fault on said line, the current-to-ground capacitance of the ungrounded portion of the system, a protective gear which comprises, in combination, at least one polyphase busbar set, polyphase isolating switch means of relatively low breaking capacity and of the multipole control type inserted between said busbar set and each of said lines, polyphase circuit-breaking means of relatively high breaking capacity and of the single-pole control type connected in shunt between said busbar set and the ground, protective control means responsive to a fault occurring in at least one phase of any of said polyphase lines for closing the corresponding phase of said circuit-breaking means during a fraction of a second, and further protective control means responsive to the presence of a fault in at least one phase of any of said polyphase lines after the end of the period of closing of the corresponding phase of said circuit-breaking means for opening all phases of said switch means between said busbar set and the polyphase lines in which the presence of a fault was detected.

6. At a station of a polyphase electric power transmission and distribution system including a plurality of polyphase lines, a protective gear which comprises, in combination, at least one main busbar set, isolating switches for connecting each of said polyphase lines to said main busbar set, at least one auxiliary busbar set, a single-pole control circuit-breaker of high breaking capacity and a single-pole control isolating switch connected in series between said main busbar set and said auxiliary busbar set, a grounding isolating switch connected between said auxiliary busbar set and the ground, an auxiliary isolating switch connected between said auxiliary busbar and each of said polyphase lines, and protective control means responsive to a fault occurring in at least one phase of each of said polyphase lines for successively closing said single-pole control isolating switch, opening said circuit-breaker, opening said single-phase control isolating switch and closing said circuit-breaker.

7. A protective gear according to claim 6, wherein said protective control means comprise a polyphase voltage transformer associated to each main busbar set and a polyphase current transformer associated to each polyphase line and, for each polyphase line, a relay unit actuated by said transformers in response to the variation of the electrical conditions in each phase of each polyphase line produced by a fault.

8. At a station of a polyphase electric power transmission and distribution system comprising a plurality of polyphase lines, a protective gear which comprises, in combination, at least two main busbar sets, isolating switches for connecting each of said polyphase lines to each of said main busbar sets, an auxiliary busbar set, a single-pole control circuit-breaker of high breaking capacity with a first polyphase terminal and a second polyphase terminal set, said first terminal being connected to said auxilary busbar set, at least two single-pole control isolating switches, one of said last mentioned switches being connected between said second terminal and each of said main busbars, a grounding isolating swtich connected between said auxiliary busbar set and the ground, an auxiliary isolating switch connected between said auxiliary busbar and each of said polyphase lines, and protective control means responsive to a fault occurring in at least one phase of each of said polyphase lines for successively closing the single-pole control isolating switch connected between said second terminal and the main busbar set to which is connected the polyphase line in which a fault has occurred, opening said circuit-breaker, opening said single-phase control isolating switch and closing said circuit-breaker.

9. A protective gear according to claim 8 further comprising shunt resistances disposed across each phase of said circuit-breaker and of said auxiliary isolating switch.

10. At a station of a polyphase electric power transmission and distribution system comprising a plurality of polyphase lines, a protective gear which comprises, in combination, at least one main busbar set, one low breaking capacity circuit-breaker for connecting each of said polyphase lines to said main busbar set, a single-pole control circut-breaker of high breaking capacity connected between said main busbar set and the ground, and protective control means, responsive to a fault occurring in at least one phase of each of said polyphase lines, for closing for a fraction of a second the corresponding phase of said circuit-breaker of high breaking capacity, said protective control means comprising a polyphase voltage transformer associated to every main busbar set and a polyphase current transformer associated to every polyphase line and, for every polyphase line, a relay unit actuated by said transformers in response to the variation of the electrical conditions in each phase of each polyphase line produced by a fault.

11. A polyphase power transmission and distribution network including two stations each comprising at least one busbar set, a polyphase line, a first isolating switch for connecting one end of said line to the busbar set in one station, a second isolating switch for connecting one end of said line to the busbar set in the other station, polyphase, single-pole control circuit-breaking means of high breaking capacity connected between the busbar set of each of said stations and the ground, and protective control means, responsive to the occurrence of a fault in at least one phase of said line, for controlling the corresponding phase of said circuit-breaking means in both stations.

12. A polyphase power transmission and distribution network including two stations each comprising at least one busbar set, a polyphase line, a first isolating switch for connecting one end of said line to the busbar set in one station, a second isolating switch for connecting one end of said line to the busbar set in the other station, polyphase, single-pole control circuit-breaking means of high breaking capacity connected between the busbar set of each of said stations and the ground, protective control means, responsive to the occurrence of a fault in at least one phase of said line, for controlling the corresponding phase of said circuit-breaking means in both stations, and further protective control means responsive to the presence of a fault in at least one phase of said line after the end of the phase controlling period of said circuit-breaking means for opening all the phases of both of said isolating switches.

13. An electric station which comprises at least two polyphase busbars, a multiplicity of terminals of polyphase lines, a series of pairs of double switches of relatively low breaking capacity for connecting each one of said line terminals with either one or the other of said busbars at will, a high breaking capacity circuit-breaker of the polyphase single-pole control type inserted between each one of said busbars and the ground, relay means for actuting each phase in the associated circuit-breaker connected to one of said busbars, said relay means being actuable by the appearance of a fault in the same phase of one of said lines, switches on said busbars, an additional polyphase circuit-breaker of the single-pole control type inserted between said two busbars, and means for causing the opening of each phase of said additional circuit-breaker previously to the actuating of the same phase of said associated circuit-breaker connected to one of said busbars on the occurrence of a fault in the same phase in any one of said lines.

14. An electric station which comprises at least two polyphase busbars, a multiplicity of terminals of polyphase lines, a series of pairs of double switches of relatively low breaking capacity for connecting each one of said line terminals with either one or the other of said busbars at will, a high breaking capacity circuit-breaker and an isolating switch, both of the polyphase single-pole control type, inserted in series between each one of said busbars and the ground, relay means actuated by the appearance of a fault in any phase of one of said lines switched on said busbars for causing the closing of that of said isolating switches which is connected to the busbars with which the faulty line is connected and, immediately afterwards, the opening of the same phase in the associated circuit-breaker connected to same busbars, an additional polyphase circuit-breaker of the single-pole control type inserted between said two busbars, and means for causing the opening of each phase of said additional circuit-breaker previously to the closing of the same phase of said isolating switch on the occurrence of a fault in the same phase in any one of said lines.

References Cited by the Examiner
UNITED STATES PATENTS

| | | | |
|---|---|---|---|
| 1,236,595 | 8/17 | Nicholson | 317—17 |
| 1,349,365 | 8/20 | Copley | 317—26 |
| 1,878,774 | 9/32 | Griscom | 317—17 |
| 2,315,585 | 4/43 | Bostwick | 317—24 |

SAMUEL BERNSTEIN, *Primary Examiner.*

WALTER L. CARLSON, *Examiner.*